March 31, 1953  D. S. POTTS  2,633,228
MASTER LINK FOR POTATO CHAINS
Filed April 11, 1951
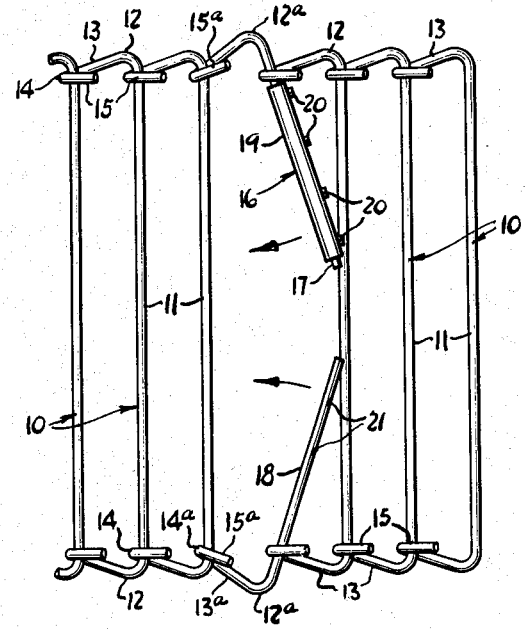
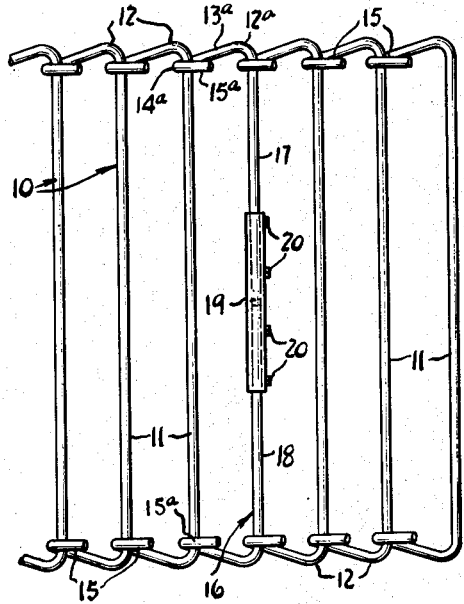
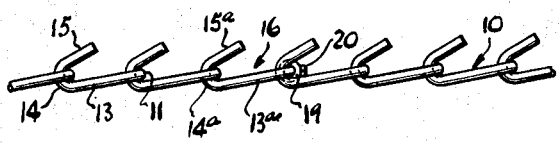
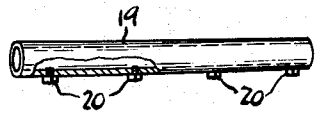
INVENTOR.
DOYLE S. POTTS
BY
Carlsen + Hagle
ATTORNEYS Patented Mar. 31, 1953

2,633,228

UNITED STATES PATENT OFFICE 2,633,228

MASTER LINK FOR POTATO CHAINS

Doyle S. Potts, Billings, Mont.

Application April 11, 1951, Serial No. 220,454

3 Claims. (Cl. 198—195)

This invention relates generally to improvements in the endless conveyors used for conveying, elevating and grading potatoes and similar root crops and which conveyors are generally called potato chains. More specifically the invention presents a quick attachable-detachable master link for such structures.

One example of the general type of conveyor here in mind is disclosed in U. S. Patent No. 2,077,941 and the conveyor consists of a plurality of links which are arranged parallel, crosswise of the direction of travel, and have offset hooks formed at their ends for engaging over the end portions of adjacent links, thus making up a wide flexible chain which is trained over and driven by suitable sprockets. The links are made up of single pieces of rod iron and may be quite long, thus forming a wide chain or open, grill-like apron well adapted to use in conveying, elevating and grading the potatoes. Due to the fact that the conveyor works in intimate contact with soil particles, due also to imperfections in the material of the links, and to the small areas of frictional contact between the hooks of one link and the next adjacent link, replacement of broken or worn links is frequently necessary. The common links are comparatively inexpensive but their replacement in the chain is a time consuming and very disagreeable task. At present it is necessary to use pinch bars or other pry tools to pull the ends of the chain assembly together in order to force the hooks of the new link into engagement with the next adjacent link, and this problem is complicated by the fact that the hooks themselves are quite long and the chain must be pulled very tight before the hooks will slip into place. This is so even if the chain itself is loosened before installing the new link and however the work is carried out it takes time and often results in barked knuckles.

It is the primary object of my invention to solve this problem by the provision of a quick attachable-detachable master link which may be used to assemble new links into a chain as required, with a minimum of time and effort. To this end I provide a master link made up of separable link sections, substantially half the length of the common link, with hooks at their opposite ends so that they may be assembled into the chain, and with means for securing the link sections firmly together when the chain is assembled. These separate link sections act as levers or handles for connecting the ends of the chain, since the link sections may be held angularly to the chain, the hooks engaged and the link sections then pulled into alignment, easily drawing the chain to its proper tautness, whereupon the link sections are fastened together and the operation completed. No tools are needed other than a wrench or the like for fastening the master link sections together.

Another object of my invention is to provide a master link of this type which is simple and inexpensive to manufacture and which in its presently preferred form consists of a pair of hooked link sections and a sleeve with set screws for telescopically receiving the ends of the sections and securing them together, all as will be presently set forth.

These and other more detailed and specific objects will be disclosed in the course of the following specification, reference being had to the accompanying drawing, in which—

Fig. 1 is a plan view of a section of a conveyor or potato chain made up of common links, showing my improved master link in the process of drawing the adjacent ends of the chain together.

Fig. 2 is a similar view with the chain assembly complete.

Fig. 3 is an edge view of the assembled chain with master link.

Fig. 4 is a perspective view, partially in section, of the sleeve for connecting the master link sections.

Referring now more particularly and by reference characters to the drawing a conventional potato chain structure is shown, consisting of common links, designated generally at 10, each comprising a transverse cross rod or link rod 11, the opposite ends of which are bent at 12 to form angular arms 13 which are in turn bent upwardly (as viewed in the drawing) at 14 into hooks 15 lying in planes perpendicular to the axis of the rod 11 but at angles to the arms 13. As clearly shown the arrangement is such that the hooks 15 will engage over the adjacent cross rods 11 just within the bends 12 thus forming a flexible endless chain, or grill-like apron conveyor; and the length of the cross rods 11 may be such that the chain will be quite wide, thus making it adaptable for transporting and grading potatoes and similar root crops. The links are made up usually of round metal rod, in a plurality of standard sizes and they are so simple that they are comparatively inexpensive. A great number are used, however, in the ordinary chain and since they work under dirty conditions and the area of frictional contact at the bends 14 with the adjacent links is small it follows that the links will wear quite rapidly and will require frequent replacement. Breakage of the links also occurs with the same result.

It is believed that it will be readily appreciated that the re-connection of the ends of a long chain of this type, after a link has worn out or been broken, will represent a considerable problem. When the new link has had its cross rod 11 placed in the hooks at one end of the chain considerable force will be required to over-tighten the chain enough so that the hooks 15 of the new link may be engaged with the cross rod at the other end of the chain. These hooks 15 cannot be shortened to help out in such installation, since the chain might then come apart, and it is at present necessary to pull and pry at the chain with pinch bars or the like until the new link can be forced into place. This requires much time and effort and all too frequently results in injury to the worker or damage to the chain.

According to my invention I provide a master link, designated generally at 16, which when assembled as seen in Figs. 2 and 3 operates exactly like any common link in the chain but which completely solves the problem of new link installation. As here shown the master link comprises separable half link sections 17 and 18 the opposite ends of which have the same bends 12a, arms 13a, bends 14a and hooks 15a as the corresponding portions 12, 13, 14 and 15 of the common links 10. Each link section 17 and 18 is, however, not more than one-half the overall length of the common links and when the chain is assembled said link sections 17 and 18 are arranged end to end in a tubular connecting sleeve 19 into which the sections telescope (Fig. 2). This sleeve has tapped openings through its wall to receive set screws 20 to secure the link sections 17 and 18 firmly in place, and if desired the link sections may be provided with flats 21, where they are engaged by these screws, for added security in the fastening.

In the operation of this master link, assuming the chain to be ready for re-connection after replacement of a worn or broken link, the adjacent ends of the chain are brought as close together as possible. With the master link 16 opened and the sleeve 19 slipped fully onto either link section 17 or 18 these sections are then held at an angle as seen in Fig. 1, through the hooks 15 at one end of the chain while the hooks 15a are engaged with the cross bar 11 of the opposite end of the chain. The link sections then act as handles or levers, and they may be grasped and pulled toward alignment in the direction of the arrows, in which operation the link sections easily exert sufficent leverage to draw the chain to proper tautness. When the link sections 17—18 are in line the sleeve 19 is returned to the center and the set screws 20 tightened to complete the operation. It will be quite obvious that the complete operation of opening the chain, installing a new link and then pulling the chain back to working condition may be carried out easily and rapidly and with no other tool than a wrench for the set screws 20. The latter, as noted in the drawing, are so placed that they will not damage the crop.

Only a single master link will be required for each chain although for convenience two or more may be used if so desired, particularly in very long chains.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For a potato conveyor chain of the type having a plurality of common links each with hooks at its ends for engagement with the adjacent link, a master link for connecting up the common links, said master link comprising two sections each less than the length of a common link and having hooks for engaging the common links and acting as levers on adjacent links to pull the chain together, and means for releasably fastening the master link sections together.

2. For a potato conveyor chain of the type having a plurality of common links each with hooks at its ends for engagement with the adjacent link, a master link for connecting up the common links, said master link comprising two sections each less than the length of a common link and having hooks for engaging the common links and acting as levers on adjacent links whereby said link sections will pull the chain taut, and one of said sections having means forming an extension to overlie the other section and fasten the link sections together.

3. For a potato conveyor chain of the type having a plurality of common links each with hooks at its ends for engagement with the adjacent link, a master link for connecting up the common links, said master link comprising two sections each substantially one-half the length of a common link and having hooks for engaging the common links and acting as levers on adjacent links whereby the said link sections may be used to pull the chain taut, a tubular sleeve telescoped over one master link section and adapted to slide across onto the other link section when the chain is assembled, and means on said sleeve for securing the same to the master link sections.

DOYLE S. POTTS.

REFERENCES CITED

The following references are of record in the file of this patent:

UNITED STATES PATENTS

| Number | Name | Date |
|--------|------|------|
| 454,181 | Nash et al. | June 16, 1891 |
| 1,647,802 | Josef | Nov. 1, 1927 |
| 1,985,535 | De Wahl | Dec. 25, 1934 |